United States Patent
Tsukagoshi

(10) Patent No.: US 11,082,696 B2
(45) Date of Patent: Aug. 3, 2021

(54) TRANSMISSION DEVICE, TRANSMISSION METHOD, RECEPTION DEVICE, AND RECEPTION METHOD

(71) Applicant: Saturn Licensing LLC, New York, NY (US)

(72) Inventor: Ikuo Tsukagoshi, Tokyo (JP)

(73) Assignee: Saturn Licensing LLC, New York, NY (US)

(*) Notice: Subject to any disclaimer, the term of this patent is extended or adjusted under 35 U.S.C. 154(b) by 0 days.

(21) Appl. No.: 16/707,279

(22) Filed: Dec. 9, 2019

(65) Prior Publication Data

US 2020/0112724 A1 Apr. 9, 2020

Related U.S. Application Data

(63) Continuation of application No. 15/022,804, filed as application No. PCT/JP2014/080559 on Nov. 18, 2014, now Pat. No. 10,542,259.

(51) Int. Cl.
*H04N 19/132* (2014.01)
*H04N 19/172* (2014.01)
(Continued)

(52) U.S. Cl.
CPC ......... *H04N 19/132* (2014.11); *H04N 19/172* (2014.11); *H04N 19/31* (2014.11); *H04N 19/70* (2014.11)

(58) Field of Classification Search
None
See application file for complete search history.

(56) References Cited

U.S. PATENT DOCUMENTS 7,639,741 B1* 12/2009 Holt .................... G06T 5/50
375/240.08
2004/0027469 A1* 2/2004 Tsuruoka ............. H04N 5/361
348/241
(Continued)

FOREIGN PATENT DOCUMENTS

EP          1 959 683 A2    8/2008
JP          2004 88244      3/2004
(Continued)

OTHER PUBLICATIONS

Office Action dated Nov. 27, 2018 in Japanese Patent Application No. 2015-549162.
(Continued)

*Primary Examiner* — Kate H Luo
(74) *Attorney, Agent, or Firm* — Oblon, McClelland, Maier & Neustadt, L.L.P.

(57) ABSTRACT

A reception device including processing circuitry is provided. The processing circuitry is configured to receive a video stream that includes, for each of a plurality of units of N consecutive pictures of a plurality of pictures, an encoded averaged picture and encoded N−1 of the N consecutive pictures of the respective unit. The averaged picture is generated based on an averaging process in which a non-linear average of the N consecutive pictures of the respective unit is calculated with different gains. The video stream includes a first sub-layer having the encoded averaged pictures and a second sub-layer having the encoded N−1 pictures of the plurality of units. The processing circuitry is configured to receive information including averaging process information indicating a method for the averaging process, and process the received video stream in accordance with the averaging process information.

17 Claims, 16 Drawing Sheets

(51) Int. Cl.
*H04N 19/31* (2014.01)
*H04N 19/70* (2014.01)

(56) References Cited

U.S. PATENT DOCUMENTS

| | | |
|---|---|---|
| 2004/0036800 A1 | 2/2004 | Ohki |
| 2004/0136686 A1 | 7/2004 | Kono et al. |
| 2005/0058197 A1* | 3/2005 | Lu .................. H04N 19/40 375/240.03 |
| 2008/0199156 A1* | 8/2008 | Uchiike .................. H04N 7/01 386/284 |
| 2008/0247462 A1 | 10/2008 | Demos |
| 2008/0303941 A1 | 12/2008 | Ohki |
| 2009/0189995 A1 | 7/2009 | Shimazaki et al. |
| 2012/0154609 A1* | 6/2012 | Ozaki .................. H04N 5/765 348/207.99 |
| 2013/0021387 A1 | 1/2013 | Takahashi et al. |
| 2013/0308049 A1 | 11/2013 | Ohki |

FOREIGN PATENT DOCUMENTS

| | | |
|---|---|---|
| JP | 2004 159191 | 6/2004 |
| JP | 2006 333071 | 12/2006 |
| JP | 2007 166198 | 6/2007 |
| JP | 2008 205693 | 9/2008 |
| JP | 2009 177527 | 8/2009 |
| JP | 2010 178124 | 8/2010 |
| JP | 2013 026727 | 2/2013 |

OTHER PUBLICATIONS

Office Action dated Jul. 3, 2018 in Chinese Patent Application No. 201480062460.5 (With English Translation) p. 1-15.
Extended European Search Report dated May 2, 2017 in Patent Application No. 14863157.5.
International Search Report dated Jan. 6, 2015, in PCT/JP2014/080559 Filed Nov. 18, 2014.

* cited by examiner

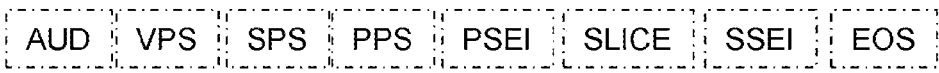

| Syntax | No. of Bits | Format |
|---|---|---|
| user_data_unregistered (size) { | | |
| uuid_iso_iec_11578 | 128 | uimslbf |
| for( i = 16; i < payloadSize; i++ ) | | |
| user_data_payload_byte | 8 | bslbf |
| } | | |

(b)

| Syntax | No. of Bits | Format |
|---|---|---|
| capturing_speed_information ( ) { | | |
| userdata_id | 16 | uimslbf |
| capturing_speed_information_length | 8 | bslbf |
| shutter_ratio_denominator_minus1 | 5 | uimslbf |
| shutter_ratio_numerator_minus1 | 5 | uimslbf |
| reserved | 5 | 0x1f |
| cross_stream_smoothing_base_flag | 1 | bslbf |
| if (cross_stream_smoothing_base_flag ) { | | |
| smoothing_type | 8 | |
| } | | |
| } | | |

FIG. 10 semantics userdata_id (16 bits)
ID OF PREDETERMINED USER DATA IS ATTACHED TO THIS FIELD.

capturing_speed_information_length (8bits)
THIS FIELD INDICATES NUMBER OF BYTES OF capturing_speed_information
(COUNTED FROM NEXT ELEMENT OF THIS ELEMENT).

shutter_ratio_denominator_minus1 ; SRD (5bits)
THIS FIELD INDICATES VALUE OF DENOMINATOR OF SHUTTER APERTURE TIME RATIO WHEN IMAGE TO BE INPUT TO
ENCODER IS GENERATED FROM SOURCE DATA THAT CAMERA TAKES.

shutter_ratio_numerator_minus1 ; SRN (5bits)
THIS FIELD INDICATES VALUE OF NUMERATOR OF SHUTTER APERTURE TIME RATIO WHEN IMAGE TO BE INPUT TO
ENCODER IS GENERATED FROM SOURCE DATA THAT CAMERA TAKES.
SHUTTER APERTURE TIME RATIO: EXPRESSION IS Ratio = (SRN+1) / (SRD+1).

cross_stream_smoothing_base_flag (1bit)
THIS FIELD INDICATES WHETHER STREAM IS ENCODED SO THAT STREAMS IN A SERVICE HAVE TEMPORAL SCALABILITY
AND BASE STREAM ON LOWEST HIERARCHAL LAYER INCLUDES TEMPORALLY VARYING ELEMENT IN STREAM ON
LAYER OTHER THAN LOWEST HIERARCHAL LAYER.
1   BASE STREAM INCLUDES TEMPORAL VARIATION IN STREAM ON LAYER OTHER THAN LOWEST HIERARCHAL LAYER.
0   BASE STREAM DOES NOT INCLUDE TEMPORAL VARIATION IN STREAM ON LAYER OTHER THAN LOWEST HIERARCHAL LAYER.

smoothing_type (8bits)
THIS FIELD INDICATES SMOOTHING (smoothing) METHOD.
0x00     LINEAR AVERAGE IS CALCULATED.
others   NON-LINEAR AVERAGE IS CALCULATED.  PROCEDURES OF AVERAGING PROCESS ARE DESIGNATED DEPENDING ON type.

| Syntax | No. of Bits | Format |
|---|---|---|
| Shutter_speed_information_descriptor ( ) { | | |
| Shutter_speed_information_descriptor_tag | 8 | uimslbf |
| Shutter_speed_information_descriptor_length | 8 | uimslbf |
| Shutter_speed_information_SEI_existed | 1 | bslbf |
| reserved | 7 | 0x7 |
| } | | | semantics

Shutter_speed_informationr_tag (8bits)
    tag VALUE THAT INDICATES Shutter_speed_information_descriptor Shutter_speed_information_SEI_existed (1bit)
  1    IT IS ENSURED THAT Shutter_speed_information SEI IS ENCODED IN video stream.
  0    IT IS NOT ENSURED THAT Shutter_speed_information SEI IS ENCODED IN video stream.

| | | |
|---|---|---|
| HEVC_descriptor() { | | |
|   descriptor_tag | 8 | uimsbf |
|   descriptor_length | 8 | uimsbf |
|   profile_space | 2 | uimsbf |
|   tier_flag | 1 | bslbf |
|   profile_idc | 5 | uimsbf |
|   reserved_zero_16bits | 16 | bslbf |
|   level_idc | 8 | uimsbf |
|   profile_compatibility_indication | 32 | bslbf |
|   temporal_layer_subset_flag | 1 | bslbf |
|   HEVC_still_present_flag | 1 | bslbf |
|   HEVC_24hr_picture_present_flag | 1 | bslbf |
|   frame_packing_arrangement_SEI_present_flag | 1 | bslbf |
|   reserved | 4 | bslbf |
|   if ( temporal_layer_subset_flag == '1') { | | |
|     temporal_id_min | 3 | uimsbf |
|     reserved | 5 | bslbf |
|     temporal_id_max | 3 | uimsbf |
|     reserved | 5 | bslbf |
|   } | | |
| } | | |

TRANSMISSION DEVICE, TRANSMISSION METHOD, RECEPTION DEVICE, AND RECEPTION METHOD

CROSS-REFERENCE TO RELATED APPLICATIONS

This application is a continuation of U.S. Ser. No. 15/022,804 filed Mar. 17, 2016, the entire content of which is incorporated herein by reference. U.S. Ser. No. 15/022,804 is a national stage of PCT/JP2014/080559 filed Nov. 18, 2014, and also claims priority under 35 U.S.C. 119 to Japanese Application No. 2013-242391 filed Nov. 22, 2013.

TECHNICAL FIELD

The present technology relates to a transmission device, a transmission method, a reception device, and a reception method. In detail, the present technology relates, for example to a transmission device that transmits the moving image data at a high frame rate (High Frame Rate).

BACKGROUND ART

Cameras that take an image at a high frame rate with a high-speed frame shutter have been known in recent years (see, for example, Patent Document 1). For example, a high frame rate is several times, dozens of times, or hundreds of times as fast as a normal frame rate, for example, of 60 or 50 fps.

In a service with a high frame rate, the moving image data taken with a camera with a high-speed frame shutter may be transmitted by being converted into a moving image sequence at a frequency lower than the frequency of the data before the moving image data is transmitted. However, the images taken with a high-speed frame shutter have a factor causing a problem on the image quality of the conventional frame interpolation technique used in the receiving and replaying end although the images have an effect of improving motion blurs and achieving an image quality with a high degree of sharpness.

The frame interpolation with images with a high degree of sharpness, which are taken with a high-speed frame shutter, brings a larger difference between the frames to which motion vector search is applicable and the frames to which motion vector search is not applicable. Thus, the difference is displayed as noticeable image degradation. High-load calculation is required in order to improve the accuracy of motion vector search in frame interpolation. However, the high-load calculation adversely affects the cost of the receiver.

CITATION LIST

Patent Document

Patent Document 1: Japanese Patent Application Laid-Open No. 2010-178124

SUMMARY OF THE INVENTION

Problems to be Solved by the Invention

In order to allow the compatibility with the conventional receiver at a normal frame rate, the compatibility is a service with a high frame rate, it is expected to convert the data of the image taken with a high-speed frame shutter in order to display the image with a predetermined or higher quality on a conventional receiver that decodes the data at a normal frame rate.

An objective of the present technology is to transmit the moving image data at a high frame rate in good condition.

Solutions to Problems

A concept of the present technology lies in a transmission device including:

an image processing unit that provides second moving image data at a predetermined frame rate by processing first moving image data at the predetermined frame rate in units of consecutive N pictures, using an image data item provided by averaging image data items of the N pictures in an averaging process as an image data item of a first picture, and using image data items of second to Nth pictures of the N pictures as image data items of second to Nth pictures without any change, the N being an integer larger than or equal to two;

an image encoding unit that generates a video stream by encoding the image data items of the pictures in the second moving image data provided in the image processing unit; and a transmission unit that transmits the video stream generated in the image encoding unit.

According to the present technology, the image processing unit can provide the second moving image data at a predetermined frame rate from the first moving image data at the predetermined frame rate. At that time, the image processing unit provides the second moving image data by processing the first moving image data in units of consecutive N pictures (N is an integer larger than or equal to two), using the image data item provided by averaging the image data items of the N pictures in an averaging process as the image data item of the first picture, and using the image data items of the second to Nth pictures of the N pictures as the image data items of the second to Nth pictures without any change. For example, the averaging process is a process for calculating a linear average or a process for calculating a non-linear average.

The image encoding unit generates a video stream by encoding the image data item of each picture in the second moving image data provided with the image processing unit. For example, the image encoding unit may generate a first video stream that includes the encoded image data item of the first picture in each of the units of N pictures, and a predetermined number of second video streams that include the encoded image data items of the second to Nth pictures in each of the units of N pictures. This allows, for example, a receiving end, which has a decoding capacity to decode the moving image data at a frame rate of 1/N of the predetermined frame rate, to select and decode only the first video stream in a decoding process. The receiving end does not need having a complicated configuration in order to perform, for example, a process for combining several video streams.

Note that, in such case, the image encoding unit may classify the image data items of the pictures in the second moving image data provided in the image processing unit into a plurality of hierarchal layers, encode the classified image data items of the pictures in each of the hierarchal layers, divide the hierarchal layers into a predetermined number of hierarchal groups, and generate a predetermined number of video streams, the video streams may include the encoded image data items of the pictures in each of the divided hierarchal groups, and a lowest hierarchal group includes the encoded image data item of the first picture in each of the units of N pictures.

In such case, for example, the image encoding unit may insert first identification information into the encoded image data items in the first video stream, and the first identification information indicates that the first video stream includes a temporally varying element of the second video stream. For example, the image encoding unit may further insert information about the averaging process into the encoded image data items in the first video stream. This enables the receiving end, for example, to recognize that the image data item corresponding to the encoded image data item of the first picture in each of the units of N pictures in the first video stream is provided from the averaging process, and which averaging process the performed averaging process is.

In such case, for example, the transmission unit may transmit the container being in a predetermined format and including the video streams, and the transmission device may further include: an identification information inserting unit that inserts second identification information into a layer in a container, the second identification information indicating that the first identification information is inserted in the encoded image data items in the first video stream. This enables the receiving end, for example, to recognize that the first identification information is inserted in the encoded image data from the second identification information without processing the encoded image data.

Additionally, the image encoding unit can be configured to insert the information about the shutter aperture time ratio of the image data item of each picture in the first moving image data at the predetermined frame rate into the encoded image data item of each picture in the video stream. This insertion enables the receiving end, for example, to adaptively switch the processes for frame interpolation in accordance with the information about the shutter aperture time ratio.

According to the present technology as described above, the moving image data at a predetermined frame rate is not transmitted without any change. The image data in which the image data item provided by averaging the image data items of N pictures in an averaging process is used as the image data item of the first picture of each of the units of N pictures is transmitted. This allows, for example, a receiving end, which has a decoding capacity to decode the moving image data at a frame rate of 1/N of the predetermined frame rate, to select and decode only the encoded image data item of the first picture in each of the units of N pictures in a decoding process in order to provide the moving image data. This enables the receiving end to display a smooth image, and to prevent the frame interpolation process with low-load calculation from causing a problem on the image quality.

Further, another concept of the present technology lies in a reception device including:

a reception unit that receives a video stream, the video stream being generated by encoding an image data item of each picture in moving image data at a predetermined frame rate; and a processing unit that processes the video stream received with the reception unit, wherein the moving image data at the predetermined frame rate is second moving image data at the predetermined frame rate, and the second moving image data is provided by processing first moving image data at the predetermined frame rate in units of consecutive N pictures, using an image data item provided by averaging image data items of the N pictures in an averaging process as an image data item of a first picture, and using image data items of second to Nth pictures of the N pictures as image data items of second to Nth pictures without any change, and the N is an integer larger than or equal to two.

According to the present technology, the reception unit receives a video stream generated by encoding the image data item of each picture in the moving image data at a predetermined frame rate. The moving image data at the predetermined frame rate is the second moving image data at the predetermined frame rate, which is provided by processing the first moving image data at the predetermined frame rate in units of consecutive N pictures (N is an integer larger than or equal to two), using the image data item provided by averaging the image data items of the N pictures in an averaging process as the image data item of the first picture, and using the image data items of the second to Nth pictures of the N pictures as the image data items of the second to Nth pictures without any change. Then, the processing unit processes the received video stream.

For example, the video stream received with the reception unit may include a first video stream that includes the encoded image data item of the first picture in each of the units of N pictures, and a predetermined number of second video streams that include the encoded image data items of the second to Nth pictures in each of the units of N pictures.

Further, another concept of the present technology lies in a reception device including:

a reception unit that receives a video stream generated by encoding an image data item of each picture in second moving image data at a predetermined frame rate, the second moving image data being provided by processing first moving image data at the predetermined frame rate in units of consecutive N pictures, using an image data item provided by averaging image data items of the N pictures in an averaging process as an image data item of a first picture, and using image data items of second to Nth pictures of the N pictures as image data items of second to Nth pictures without any change, the N being an integer larger than or equal to two;

an image decoding unit that provides the second moving image data at the predetermined frame rate by decoding the video stream received with the reception unit; and an image processing unit that provides the first moving image data by processing the second moving image data provided in the image decoding unit.

According to the present technology, the reception unit receives a video stream. The video stream is generated by encoding the image data item of each picture in the second moving image data at a predetermined frame rate. The second moving image data is provided by processing the first moving image data at the predetermined frame rate in units of consecutive N pictures (N is an integer larger than or equal to two), using the image data item provided by averaging the image data items of the N pictures in an averaging process as the image data item of the first picture, and using the image data items of the second to Nth pictures of the N pictures as the image data items of the second to Nth pictures without any change.

For example, the video stream received with the reception unit may include a first video stream that includes the encoded image data item of the first picture in each of the units of N pictures, and a predetermined number of second video streams that include the encoded image data items of the second to Nth pictures in each of the units of N pictures.

The image decoding unit provides the second moving image data at the predetermined frame rate by decoding the video stream received with the reception unit. The image processing unit provides the first moving image data by processing the second moving image data provided with the image decoding unit. In the process, the image data item of the first picture in each of the units of N pictures is restored to the image data item of the first picture before the averaging process from the image data item provided by averaging the image data items of the N pictures.

According to the present technology as described above, the image data item of the first picture in each of the units of N pictures is restored to the image data item of the first picture before the averaging process. This enables, for example, a receiving end, which has a decoding capacity to decode the moving image data at the predetermined frame rate, to display a smooth image with a high degree of sharpness at a high frame rate.

Note that, in the present technology, for example, a display processing unit that provides third moving image data at a frame rate higher than the predetermined frame rate by interpolating the first moving image data provided in the image processing unit in a temporal direction may further be included. In such case, for example, information about a shutter aperture time ratio of an image data item of each picture in the first moving image data may be inserted in an encoded image data item of each picture in the video stream received with the reception unit, and the display processing unit may switch processes for frame interpolation in accordance with the shutter aperture time ratio information.

Further, the concept of the present technology lies in a transmission device including:

an image encoding unit that generates a video stream by encoding an image data item of each picture in moving image data at a predetermined frame rate; the image encoding unit that inserts information about a shutter aperture time ratio of an image data item of each picture in the first moving image data at the predetermined frame rate into the encoded image data item of each picture in the video stream; and a transmission unit that transmits the video stream generated in the image encoding unit.

Further, the concept of the present technology lies in a reception device including:

a reception unit that receives a video stream provided by encoding an image data item of each picture in moving image data at a predetermined frame rate;

an image decoding unit that provides the moving image data at the predetermined frame rate by decoding the video stream received with the reception unit; and a display processing unit that provides third moving image data at a frame rate higher than the predetermined frame rate by interpolating the first image data provided in the image decoding unit in a temporal direction, wherein information about a shutter aperture time ratio of an image data item of each picture in the moving image data at the predetermined frame rate is inserted in an encoded image data item of each picture in the video stream received with the reception unit, and the display processing unit switches processes for frame interpolation in accordance with the shutter aperture time ratio information.

Effects of the Invention

According to the present technology, the moving image data at a high frame rate can be transmitted in good condition. Note that the effects of the present technology are not necessarily limited to the effects described herein, and can include any one of the effects described herein.

BRIEF DESCRIPTION OF DRAWINGS

FIG. 7 is a diagram of an exemplary structure of an NAL unit header and the contents of main parameters in the exemplary structure.

FIG. 8 is an explanatory diagram of the formation of encoded image data item of each picture in HEVC.

FIG. 9 is a diagram of an exemplary structure of an interface for inserting capturing speed information SEI, and an exemplary structure of "capturing_speed_information( )".

FIG. 10 is a diagram of the contents of main information in the exemplary structure of "capturing_speed_information( )".

FIG. 11 is a diagram of an exemplary structure of a shutter speed information descriptor, and the contents of main information in the exemplary structure.

FIG. 12 is a diagram of an exemplary structure of an HEVC descriptor.

MODE FOR CARRYING OUT THE INVENTION

Modes for carrying out the invention (hereinafter referred to as "embodiments") will be described hereinafter. Note that the description will be given in the following order.

1. Embodiment
2. Exemplary variation

1. Embodiment

Figure 1:
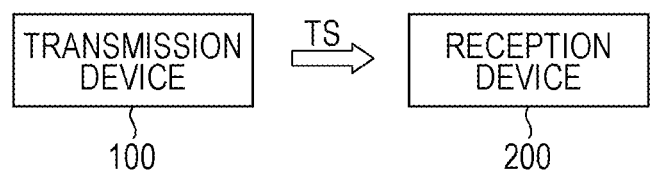
FIG. 1 is a block diagram of an exemplary configuration of a transmission and reception system that is an embodiment.

[Transmission and Reception System]
FIG. 1 illustrates an exemplary configuration of a transmission and reception system 10 that is an embodiment. The transmission and reception system 10 includes a transmission device 100 and a reception device 200.

The transmission device 100 transmits a transport stream TS that is a container over broadcasting waves. The transport stream TS includes a video stream, for example, provided by classifying image data item of each picture forming moving image data at a high frame rate, which is 120 fps in this embodiment, into a plurality of hierarchical layers and encoding the image data items. For example, the image data items are encoded in H.264/AVC or H.265/HEVC in such a case.

The moving image data at 120 fps that is to be encoded is the second moving image data at 120 fps provided by processing the first moving image data at 120 fps in units of consecutive two pictures, using the image data item provided by averaging the image data items of the two pictures in a linear or non-linear averaging process as the image data item of the first picture, and using the image data item of the second picture of the two pictures as the image data item of the second picture without any change.

Alternatively, the moving image data at 120 fps that is to be encoded can be, for example, the output from a camera that outputs the moving image data at 120 fps, or can be the data provided by changing the frame rate of the output from a camera that outputs the moving image data at a higher frame rate in a changing process.

Figure 2:
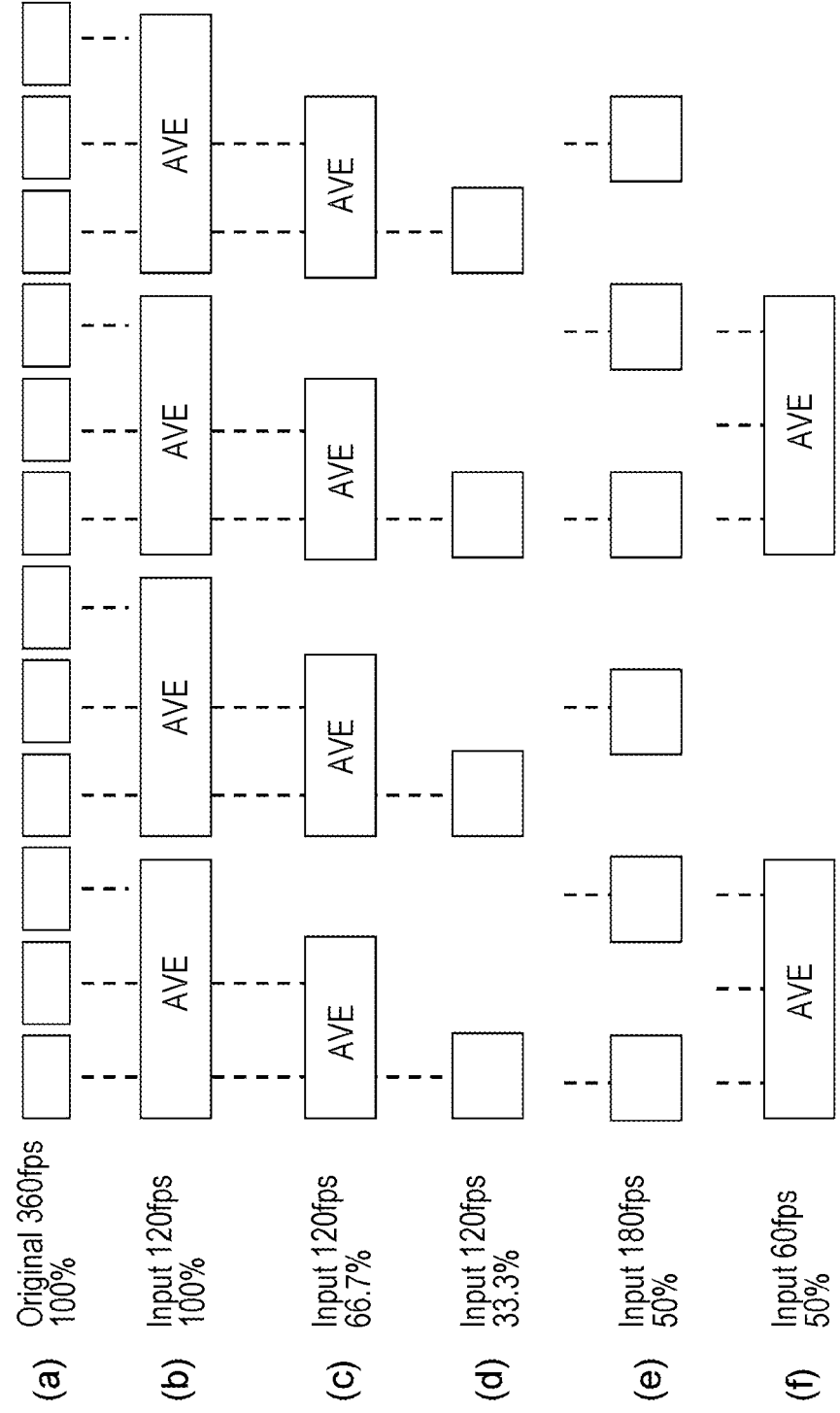
FIG. 2 is a diagram of exemplary processes for changing a frame rate.

FIG. 2 illustrates exemplary processes for changing the frame rate. FIG. 2(a) illustrates the original moving image data that is the output from a camera, the shutter aperture time ratio is 100%, and the frame rate is 360 fps. FIG. 2 (b) illustrates exemplary moving image data at the frame rate of 120 fps after the frame rate is changed in a changing process. In this changing process, the original moving image data is processed in units of three pictures. The image data items of the three pictures are averaged so that the image data item of a picture in the moving image data at the changed frame rate is generated. All of the image data items of the three pictures are used in this changing process, and thus the shutter aperture time ratio is 100% to the time covered by the original image sequence.

FIG. 2(c) illustrates exemplary moving image data at the frame rate of 120 fps after the frame rate is changed. In this changing process, the original moving image data is processed in units of three pictures. The image data items of two pictures among the three pictures are averaged so that the image data item of a picture in the moving image data at the changed frame rate is generated. The image data items of two pictures among the three pictures are used in this changing process, and thus the shutter aperture time ratio is 66.7% to the time covered by the original image sequence.

FIG. 2(d) illustrates exemplary moving image data at the frame rate of 120 fps after the frame rate is changed. In this changing process, the original moving image data is processed in units of three pictures. The image data item of a picture among the three pictures is used as the image data item of a picture in the moving image data at the changed frame rate. The image data item of a picture among the three pictures is used in this changing process, and thus the shutter aperture time ratio is 33.3% to the time covered by the original image sequence.

FIG. 2(e) illustrates exemplary moving image data at the frame rate of 180 fps after the frame rate is changed. In this changing process, the original moving image data is processed in units of two pictures. The image data item of a picture of the two pictures is used as the image data item of a picture in the moving image data at the changed frame rate. The image data item of a picture of the two pictures is used in this changing process, and thus the shutter aperture time ratio is 50% to the time covered by the original image sequence.

FIG. 2(f) illustrates exemplary moving image data at the frame rate of 60 fps after the frame rate is changed. In this changing process, the original moving image data is processed in units of six pictures. The image data items of the first three pictures among the six pictures are averaged so that the image data item of a picture in the moving image data at the changed frame rate is generated. The image data items of three pictures among the six pictures are used in this changing process, and thus the shutter aperture time ratio is 50% to the time covered by the original image sequence.

The transport stream TS includes a predetermined number of video streams. In this embodiment, the transport stream TS includes a base stream (first video stream) that includes the encoded image data item of the first picture in each of the units of two pictures, and an enhancement stream (second video stream) that includes the encoded image data item of the second picture in each of the units of two pictures.

In this embodiment, a plurality of hierarchal layers is divided into two hierarchal groups. A base stream including the encoded image data items of the pictures in the lowest hierarchal group, and an enhancement stream including the encoded image data items of the pictures in a hierarchal group upper than the lowest hierarchal group are generated. In such a case, the encoded image data item of the first picture in each of the units of two pictures corresponds to the encoded image data item of a picture in the lowest hierarchal group.

The hierarchy identification information that is used to identify the hierarchal layer to which each picture belongs is added to the encoded image data item of each picture in each hierarchal layer. In this embodiment, the hierarchy identification information ("nuh_temporal_id_plus1" that means temporal_id) is placed at the header part of an NAL unit (nal_unit) in each picture. Adding the hierarchy identification information as described above enables the receiving end to identify the hierarchal layer of each picture in the NAL unit layer.

In this embodiment, the identification information indicating that the base stream includes a temporally varying element of the enhancement stream, in other words, that the image data item corresponding to the encoded image data item of each picture in the base stream is provided from an averaging process (the first identification information), and the averaging process information indicating which averaging process is performed are inserted in the encoded image data items included in the base stream and the enhancement stream. The information enables the receiving end to easily recognize that the image data item corresponding to the encoded image data item of the first picture of each of the units of two pictures in the base stream is provided from an averaging process, and which averaging process the performed averaging process is.

In this embodiment, the identification information (the second identification information) indicating that the above-mentioned identification information (the first identification information) is inserted in the encoded image data item is inserted in the layers of the transport stream TS. This identification information is inserted as a descriptor in a video elementary stream loop corresponding to each video stream under a program map table. This information enables, for example, the receiving end to identify that the identification information is inserted in the encoded image data item from this identification information without processing the encoded image data item.

In this embodiment, the information about the shutter aperture time ratio of the image data item of each picture in the first moving image data is inserted in the encoded image data items in the base stream and the enhancement stream. This information enables, for example, the receiving end to adaptively switch the processes for frame interpolation in accordance with the information about the shutter aperture time ratio.

The reception device 200 receives the transport stream TS transmitted from the transmission device 100 over the broadcasting waves. When having a decoding capacity to decode the moving image data of 60 fps, the reception device 200 decodes only the base stream included in the transport stream TS to provide the moving image data of 60 fps, and replays the image.

Alternatively, when having a decoding capacity to decode the moving image data of 120 fps, the reception device 200 decodes both of the base stream and enhancement stream included in the transport stream TS and provides the moving image data of 120 fps (the second moving image data). Then, the reception device 200 generates the first image data of 120 fps from the second moving image data of 120 fps in accordance with, for example, the averaging process information, and replays the image.

Note that the reception device 200 interpolates the moving image data in a temporal direction in an interpolation process as necessary to provide the moving image data at a higher frame rate before displaying the image. Then, the reception device 200 displays the image. In such a case, the reception device 200 switches the processes for frame interpolation in accordance with the information about the shutter aperture time ratio inserted in the encoded image data item of each picture.

[Configuration of Transmission Device]

Figure 3:
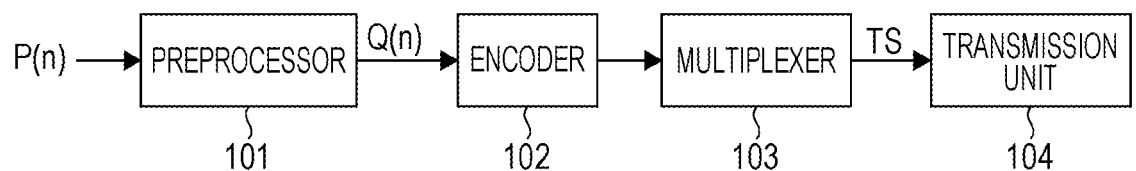
FIG. 3 is a block diagram of an exemplary configuration of a transmission device.

FIG. 3 illustrates an exemplary configuration of the transmission device 100. The transmission device 100 includes a preprocessor 101, an encoder 102, a multiplexer 103, and a transmission unit 104. The preprocessor 101 process moving image data P(n) (the first moving image data) of 120 fps to provide the moving image data Q(n) (the second moving image data) of 120 fps.

In this configuration, the preprocessor 101 provides the moving image data Q (n) at 120 fps by processing the moving image data P(n) of 120 fps in units of consecutive two pictures, using the image data item provided by averaging the image data items of the two pictures in a linear or non-linear averaging process as the image data item of the first picture, and using the image data item of the second picture of the two pictures as the image data item of the second picture without any change.

Figure 4:
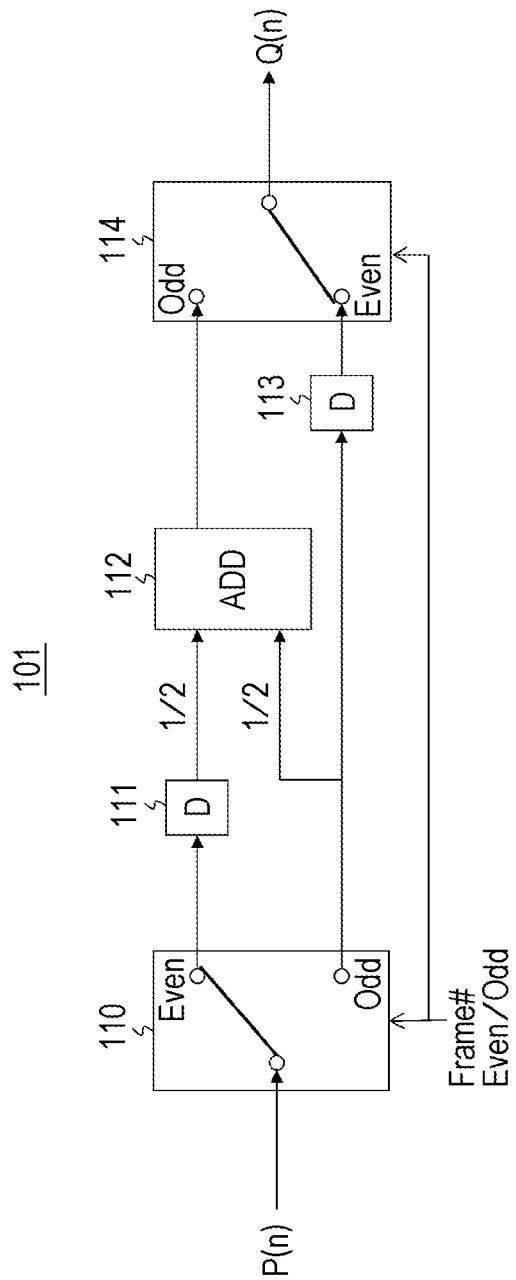
FIG. 4 is a block diagram of an exemplary configuration of a preprocessor included in the transmission device.

FIG. 4 illustrates an exemplary configuration of the preprocessor 101. The preprocessor 101 includes switch circuits 110 and 114, delay elements 111 and 113 for a frame period, and an addition circuit 112. The moving image data P(n) of 120 fps is provided to a movable terminal of the switch circuit 110. The switch circuit 110 is connected to a fixed terminal on the "Even" side while an even frame is provided, and connected to a fixed terminal on the "Odd" side while an odd frame is provided.

The image data item of the even frame provided to the fixed terminal on the "Even" side of the switch circuit 110 is delayed by a frame period in the delay element 111 and is input with a gain of "½" to the addition circuit 112. The image data item of the odd frame provided to the fixed terminal on the "Odd" side of the switch circuit 110 is input with a gain of "½" to the addition circuit 112.

The addition circuit 112 calculates a linear average of consecutive two image data items (the image data items of an even frame and an odd frame). The image data item output from the addition circuit 112 is input to the fixed terminal on the "Odd" side of the switch circuit 114. The image data item of the odd frame provided to the fixed terminal on a side of the switch circuit 110 is delayed by a frame period in the delay element 113, and is input to the fixed terminal of the "Even" side of the switch circuit 114.

The switch circuit 114 is connected to the fixed terminal of the "Even" side while an even frame is provided, and is connected to the fixed terminal of the "Odd" side while an odd frame is provided. The moving image data Q(n) at 120 fps in which the image data items of the even frames and image data items of the odd frames provided from the averaging process are alternately placed is provided from the movable terminal of the switch circuit 114.

FIGS. 5(a) and 5(b) schematically illustrate an exemplary relationship between the data (the moving image data P(n)) input to the preprocessor 101 and the data (the moving image data Q(n)) output from the preprocessor 101. The image data items Q0#, Q1, Q2#, Q3, . . . of pictures in the moving image data Q(n) are provided from the image data items P0, P1, P2, P3, . . . of pictures in the moving image data P(n), respectively.

Note that, in FIGS. 5(a) and 5(b), the numerical value in the double quotation marks " " is an exemplary pixel value in the image data item in each frame. For example, the image data item Q0# has a pixel value of "7", which is the average of the pixel value "6" of the image data item P0 and the pixel value "8" of the image data item P1. This value indicates that the image data Q0# is provided by averaging the image data item P0 and image data item P1 in a linear averaging process. For example, the image data item Q1 has a pixel value of "8", which is the same as the pixel value "8" of the image data item P1. This value indicates that the image data item Q1 is identical to the image data item P1.

With reference to FIG. 3 again, the encoder 102 hierarchically encodes the moving image data Q(n) at 120 fps provided in the preprocessor 101. The encoder 102 classifies the image data items of the pictures in the moving image data Q(n) into a plurality of hierarchical layers. The encoder 102 encodes the classified image data items in each of the hierarchical layers and generates a video stream including the encoded image data items of the pictures in each of the hierarchical layers. The encoder 102 performs encoding, for example, in H.264/AVC or H.265/HEVC. In the encoding, the encoder 102 performs the encoding so that the picture to be referenced (the referenced picture) belongs to the self-hierarchical layer and/or a layer lower than the self-hierarchical layer.

Figure 6:
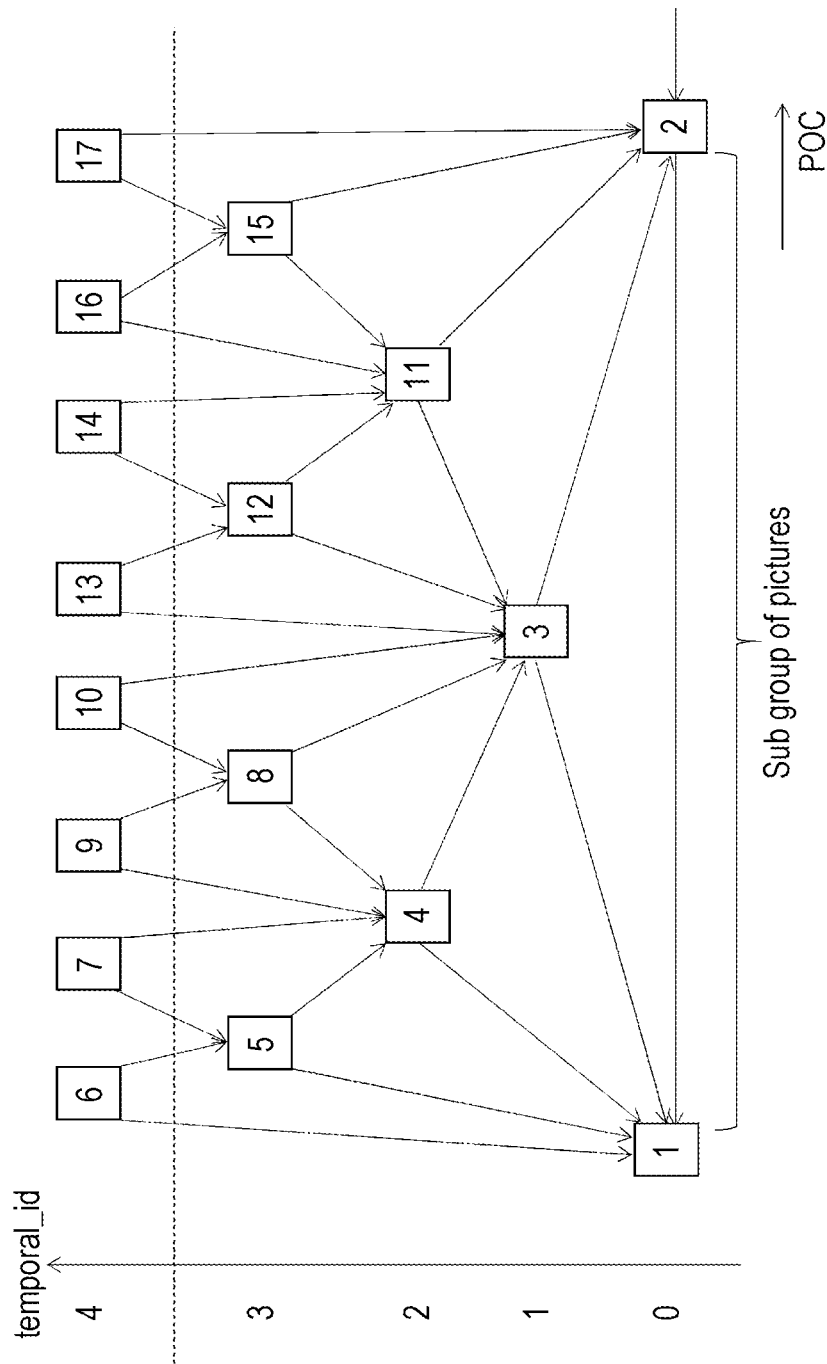
FIG. 6 is a diagram of an exemplary hierarchical encoding performed in an encoder.

FIG. 6 illustrates exemplary hierarchical encoding performed in the encoder 102. In this example, the data times are classified into five hierarchical layers from zero to four. The image data items of the pictures in each of the hierarchical layers are encoded. The hierarchical layers are shown on the vertical axis. Zero to four are set as temporal id (the hierarchy identification information) placed in the header part of the NAL unit (nal_unit) included in the encoded image data items of the pictures in the hierarchical layers from zero to four. On the other hand, the picture order of composition (POC) is shown on the horizontal axis. The earlier display times are shown on the left side of the horizontal axis, and the later display times are shown on the right side.

FIG. 7(a) illustrates an exemplary structure (Syntax) of an NAL unit header. FIG. 7(b) illustrates the contents (Semantics) of the main parameters in the exemplary structure. The one-bit field of "Forbidden_zero_bit" requires zero. The six-bit field of "NaL_unit_type" indicates the type of the NAL unit. The six-bit field of "Nuh_layer_id" is assumed as zero herein. The three-bit field of "Nuh_temporal_id_plus1" indicates temporal_id and takes the value increased by one (one to seven).

With reference to FIG. 6 again, each rectangular frame is a picture and the number is the order in which the pictures are encoded, in other words, the order of encoding (the order of decoding on the receiving end). In the example of FIG. 6, 16 pictures "2" to "17" form a sub picture group (Sub group of pictures). The picture "2" is the first picture of the sub picture group. The picture "1" is a picture of the previous sub picture group. Some sub picture groups gather and form a group of pictures (GOP).

The encoded image data items of the first pictures of the GOP includes NAL units AUD, VPS, SPS, PPS, PSEI, SLICE, SSEI, and EOS as illustrated in FIG. 8. On the other hand, the pictures other than the first pictures of GOP include the NAL units AUD, PPS, PSEI, SLICE, SSEI, and EOS. VPS can be transmitted once in a sequence (GOP) together with SPS while PPS can be transmitted in every picture. Note that EOS does not necessarily exist.

With reference to FIG. 6 again, the solid arrows show the reference relationships among the pictures when the pictures are encoded. For example, the picture "2" is a P picture and is encoded with reference to the picture "1". The picture "3" is a B picture that can be referenced and is encoded with reference to the pictures "1" and "2". Similarly, the other pictures are encoded with reference to a near picture in the display order. Note that the pictures on the top hierarchal layer are not referenced by the other pictures.

With reference to FIG. 3 again, the encoder 102 generates a predetermined number of video streams. In this embodiment, the encoder 102 generates a base stream that includes the encoded image data items of even frames, and an enhancement streams that include the encoded image data items of odd frames. Then, a plurality of hierarchal layers is divided into two groups of hierarchal layers. A base stream that includes the encoded image data items of the pictures on the lowest hierarchal group and an enhancement stream that includes the encoded image data items of the pictures on a hierarchal group upper than the lowest hierarchal group are generated. The encoded image data items of even frames described above correspond to the encoded image data items of the pictures on the lowest hierarchal group.

In the exemplary hierarchal encoding in FIG. 6, the encoder 102 classifies the hierarchal layers into two hierarchal groups, for example, by classifying the hierarchal layers 0 to 3 into the lowest hierarchal group and the hierarchal layer 4 into the hierarchal group positioned on the lowest hierarchal group. The hierarchal groups are divided with a dashed line in FIG. 6. In this division, the video stream including the encoded image data items of the pictures on the lowest hierarchal group is determined as the base stream, of which stream type is "0x24". The video stream including the encoded image data of the pictures on the hierarchal group positioned on the lowest hierarchal group is determined as the enhancement stream, of which stream type is "0x25" that is newly defined.

The stream types are included in the identification information used to identify whether each of the predetermined number of video streams is a base stream or an enhancement stream. The stream type is inserted in a layer in the transport stream TS. In other words, the stream type is inserted in a video elementary stream loop (Video ES loop) placed under the program map table (PMT), corresponding to each of the predetermined number of video streams.

As described above, the encoder 102 inserts the identification information (the first identification information) and the averaging process information into the encoded image data item of each picture included in the base stream and the enhancement stream. The first identification information indicates that the image data item corresponding to the encoded image data item of each picture included in the base stream is provided from an averaging process. The averaging process information indicates which averaging process is performed. As described above, the encoder 102 further inserts the information about the shutter aperture time ratio of the image data item of each picture in the moving image data P(n) into the encoded image data item of each picture included in the base stream and the enhancement stream (see FIGS. 2(b) to 2(d)).

The encoder 102 inserts the capturing speed information SEI (Capturing_speed_information SEI) that is newly defined as one of the prefixes SEI (Prefix_SEI).

FIG. 9(a) illustrates an exemplary structure (Syntax) of the interface (I/F) used to insert the capturing speed information SEI. The field of "uuid_iso_iec_11578" has an UUID value indicated with "ISO/IEC 11578:1996 Annex A.". The "capturing_speed_information ( )" is inserted into the field of "user_data_payload_byte".

FIG. 9(b) illustrates an exemplary structure (Syntax) of the "capturing_speed_information( )". FIG. 10 illustrates the contents (Semantics) of the main information in the exemplary structure. The ID of predetermined user data is attached to the 16-bit field of "userdata_id". The eight-bit field of "capturing_speed_information_length" indicates the number of bytes of "capturing_speed_information" (the number is counted from the next element of the element).

The five-bit field of "shutter_ratio_denominator_minus1" indicates the value of the denominator of the shutter aperture time ratio when an image to be input to the encoder is generated from the source data that the camera takes. The five-bit field of "shutter_ratio_numerator_minus1" indicates the value of the numerator of the shutter aperture time ratio when an image to be input to the encoder is generated from the source data that the camera takes. In this example, the shutter aperture time ratio is indicated with (SRN+1)/(SRD+1).

The one-bit field of "cross_stream_smoothing_base_flag" indicates whether the stream is encoded so that a plurality of streams included in a service has temporal scalability and the base stream (base stream) on the lowest hierarchal layer includes a temporally varying element of a stream on a layer other than the lowest hierarchal layer. In other words, the one-bit field indicates whether the image data item corresponding to the encoded image data item of each picture included in the base stream is provided from an averaging process. The "1" means that the base stream includes a temporally varying element of a stream on a layer other than the lowest hierarchal layer. The "0" means that the base stream does not include a temporally varying element of a stream on a layer other than the lowest hierarchal layer.

When the one-bit field of "cross_stream_smoothing_base_flag" is "1", the eight-bit field of "smoothing_type" exists. The field indicates a method for smoothing, namely, for an averaging process. The "0x00" indicates that a linear average is calculated while the other values indicate that a non-linear average is calculated. The procedures of the averaging process are designated depending on the type. Note that FIGS. 5(a) and 5(b) are exemplary calculation of a linear average. When a non-linear average is calculated, for example, the gain of the picture P0 differs from the gain of the picture P1.

With reference to FIG. 3 again, the multiplexer 103 packetizes the video stream generated in the encoder 102 as a Packetized Elementary Stream (PES) packet. The multiplexer 103 multiplexes the video stream by packetizing the video stream as a transport packet. Then, the multiplexer 103 provides the transport stream TS as a multiplexed stream. In this embodiment, the transport stream TS includes a base stream and an enhancement stream.

The multiplexer 103 inserts the identification information (the second identification information) into a layer in the transport stream TS. The second identification information indicates that the identification information (the first identification information) is inserted in the encoded image data items included in the base stream and the enhancement stream. The identification information is inserted as a descriptor in a video elementary stream loop placed under the program map table, corresponding to each video stream.

The multiplexer 103 inserts a shutter speed information descriptor (Shutter_speed_information_descriptor) that is newly defined together with an HEVC descriptor (HEVC_descriptor). FIG. 11(a) illustrates an exemplary structure (Syntax) of the shutter speed information descriptor. FIG. 11(b) illustrates the contents (Semantics) of the main information in the exemplary structure.

The eight-bit field of "Shutter_speed_information_descriptor_tag" indicates the type of the descriptor. In this example, the eight-bit field indicates that the descriptor is a shutter speed information descriptor. The eight-bit field of "Shutter_speed_information_descriptor_length" indicates the length (size) of the descriptor. The eight-bit field indicates the number of subsequent bytes as the length of the descriptor. In this example, the eight-bit field indicates that the length is a byte.

The one-bit field of "Shutter_speed_information SEI existed" indicates whether the capturing speed information SEI (Capturing_speed_information SEI) is encoded in the video stream. The "1" indicates that it is ensured that the SEI is encoded in the video stream. The "0" indicates that it is not ensured that the SEI is encoded in the video stream.

FIG. 12 illustrates an exemplary structure (Syntax) of an HEVC descriptor (HEVC_descriptor). The eight-bit field of "descriptor_tag" indicates the type of the descriptor. In this example, the eight-bit field indicates that the descriptor is an HEVC descriptor. The eight-bit field of "descriptor_length" indicates the length (size) of the descriptor. The eight-bit field indicates the number of subsequent bytes as the length of the descriptor.

The eight-bit field of "level_idc" indicates a level designation value of the bit rate. When "temporal_layer_subset_flag=1" holds, the five-bit field of "temporal_id_min" and the five-bit field of "temporal_id_max" exist. The "temporal_id_min" indicates the value of temporal_id on the lowest hierarchal layer of the hierarchically encoded data items included in the corresponding video stream. The "temporal_id_max" indicates the value of temporal_id on the top hierarchal layer of the hierarchically encoded data items included in the corresponding video stream.

Figure 13:
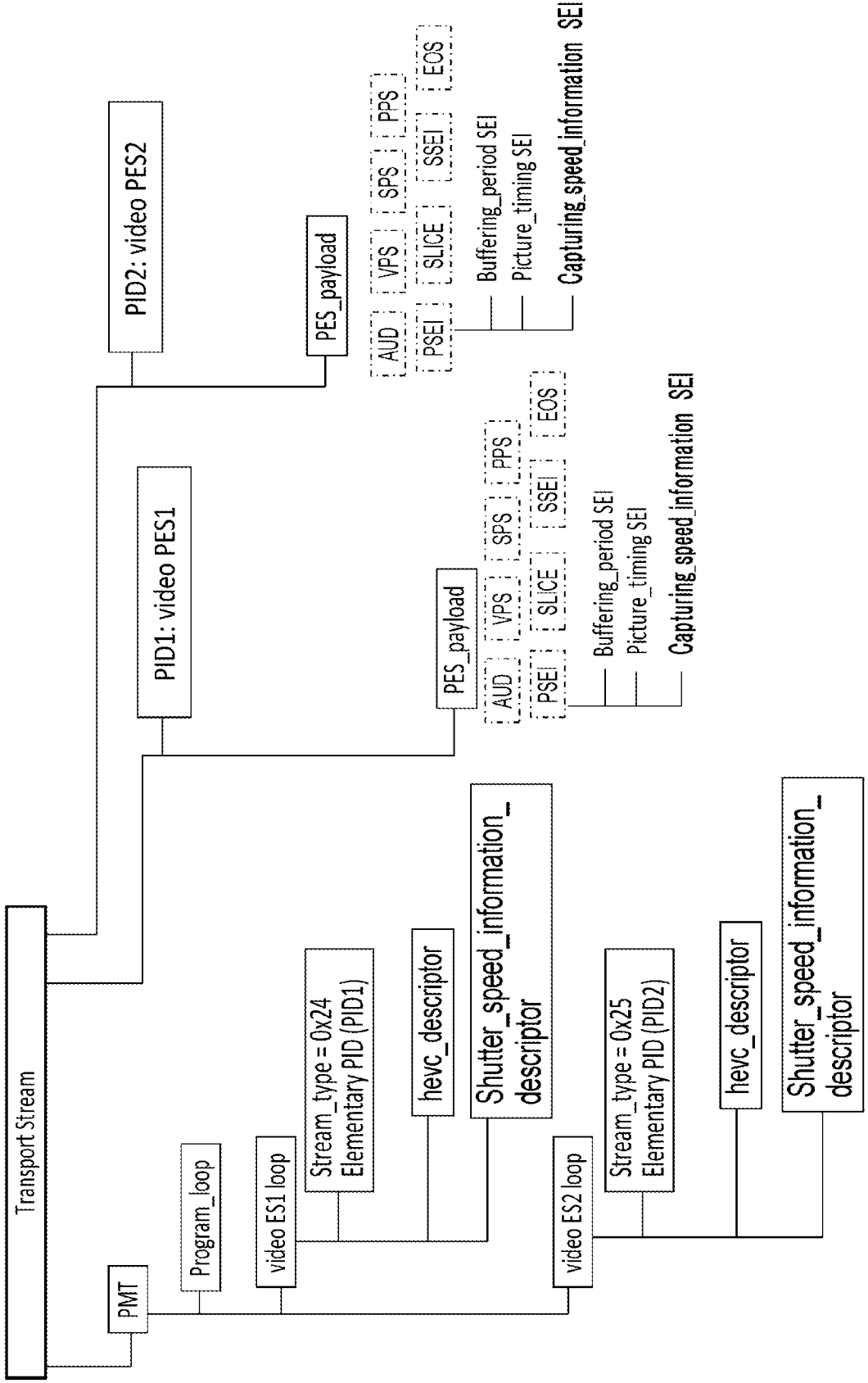
FIG. 13 is a diagram of an exemplary formation of a transport stream TS.

FIG. 13 illustrates an exemplary formation of the transport stream TS. The transport stream TS includes two video streams, a base stream and an enhancement stream. In other words, a PES packet "video PES1" that is the base stream exists and a PES packet "video PES2" that is the enhancement stream exists in the exemplary formation. The capturing speed information SEI is inserted in the encoded image data item of each picture contained in the PES packets "video PES1" and "video PES2".

A Program Map Table (PMT) is included as a type of Program Specific Information (PSI) in the transport stream TS. The PSI is the information that indicates which program each elementary stream included in the transport stream belongs to.

A program loop (Program loop) that describes the information about the entire program exists in the PMT. An elementary stream loop including the information about each video stream also exists in the PMT. In the exemplary formation, the video elementary stream loop "video ES1 loop" corresponding to the base stream exists while the video elementary stream loop "video ES2 loop" corresponding to the enhancement stream exists.

The information about the base stream (video PES1), for example, the type of the stream, and the packet identifier (PID) is placed in the "video ES1 loop", together with a descriptor that describes the information about the video stream. The type of stream is "0x24" that indicates the base stream. The HEVC descriptor and shutter speed information descriptor described above are inserted as a descriptor.

The information about the enhancement stream (video PES2), for example, the type of the stream, and the packet identifier (PID) is placed in the "video ES2 loop", together with a descriptor that describes the information about the video stream. The type of stream indicates the enhancement stream and, for example, is "0x25" that is newly defined. The HEVC descriptor and shutter speed information descriptor described above are inserted as a descriptor.

With reference to FIG. 3 again, the transmission unit 104 modulates the transport stream TS, for example, with a modulation method appropriate for the broadcasting, for example, with QPSK/OFDM modulation. The transmission unit 104 transmits an RF modulation signal from a transmission antenna.

The operation of the transmission device 100 illustrated in FIG. 3 will briefly be described. The moving image data P(n) (the first moving image data) at 120 fps is input as the moving image data at a high frame rate to the preprocessor 101. The preprocessor 101 processes the moving image data P(n) at 120 fps and provides the moving image data Q(n) (the second moving image data) at 120 fps.

In this process, the preprocessor 101 provides the moving image data Q (n) at 120 fps by processing the moving image data P(n) in units of consecutive two pictures, using the image data item provided by averaging the image data items of the two pictures in a linear or non-linear averaging process as the image data item of the first picture, and using the image data item of the second picture of the two pictures as the image data item of the second picture without any change (see FIGS. 5(a) and 5(b)).

The moving image data Q(n) at 120 fps provided in the preprocessor 101 is provided to the encoder 102. The encoder 102 hierarchically encodes the moving image data Q(n). In other words, the encoder 102 classifies the image data items of the pictures in the moving image data Q (n) into a plurality of hierarchal layers to encode the image data items, and generates a video stream including the encoded image data items of the pictures in each of the hierarchal layers. The hierarchical encoding is performed so that the picture to be referenced belongs to the self-hierarchal layer and/or a hierarchal layer lower than the self-hierarchal layer.

The encoder 102 generates a base stream that includes the encoded image data items of even frames, and an enhancement stream that includes the encoded image data items of odd frames. In the generation, the hierarchal layers are divided into two hierarchal groups. Thus, the encoder 102 generates the base stream, which includes the encoded image data items of the pictures in the lowest hierarchal group, and the enhancement stream, which includes the encoded image data items of the pictures in the hierarchal group upper than the lowest group. The encoded image data items of even frames described above correspond to the encoded image data items of the pictures in the lowest hierarchal group.

The encoder 102 inserts the identification information (the first identification information) and the averaging process information into the encoded image data item of each picture included in the base stream and the enhancement stream. The first identification information indicates that the image data item corresponding to the encoded image data item of each picture included in the base stream is provided from an averaging process. The averaging process information indicates which averaging process is performed. The encoder 102 further inserts the information about the shutter aperture time ratio of the image data item of each picture included in the moving image data P(n) into the encoded image data item of each picture included in the base stream and the enhancement stream. Specifically, the encoder 102 inserts the capturing speed information SEI, which is newly defined, as one of the prefixes SEI.

The video stream generated in the encoder 102 is provided to the multiplexer 103. The multiplexer 103 packetizes the video stream generated in the encoder 102 as a PES packet, and multiplexes the video stream as a transport packet to provide the transport stream TS as a multiplexed stream. The transport stream TS includes a base stream and an enhancement stream.

The multiplexer 103 inserts the identification information (the second identification information) into a layer in the transport stream TS. The second identification information indicates that the identification information (the first identification information) is inserted in the encoded image data items included in the base stream and the enhancement stream. The identification information is inserted as a descriptor into a video elementary stream loop placed under the program map table, corresponding to each video stream. Specifically, the multiplexer 103 inserts a shutter speed information descriptor, which is newly defined, together with an HEVC descriptor.

The transport stream TS generated in the multiplexer 103 is transmitted to the transmission unit 104. The transmission unit 104 modulates the transport stream TS in a modulation method appropriate for broadcasting, for example, in QPSK/OFDM modulation, and transmits an RF modulation signal from a transmission antenna.

[Configuration of Reception Device]

Figure 14:
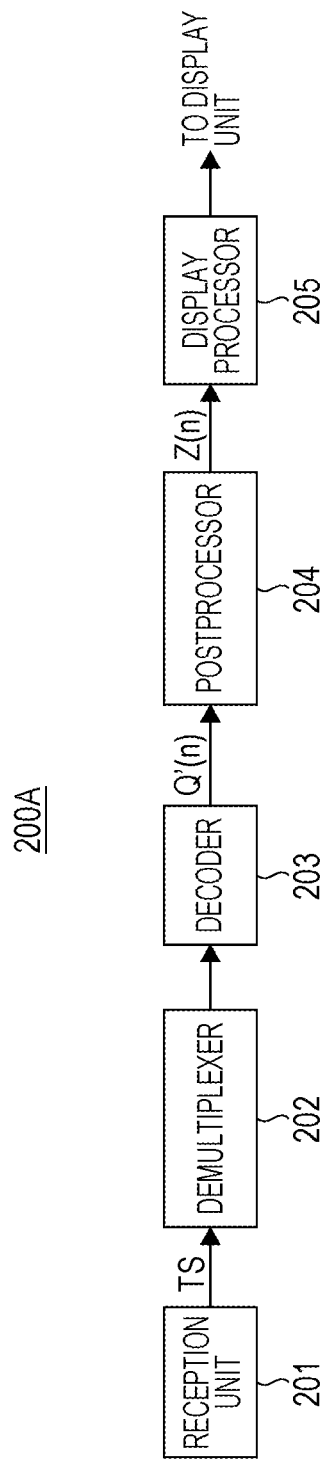
FIG. 14 is a block diagram of an exemplary configuration of a (high frame rate compatible) reception device.

FIG. 14 illustrates an exemplary configuration of a reception device 200A that has a decoding capacity to decode the moving image data at 120 fps. The reception device 200A includes a reception unit 201, a demultiplexer 202, a decoder 203, a postprocessor 204, and a display processor 205.

Figure 15:
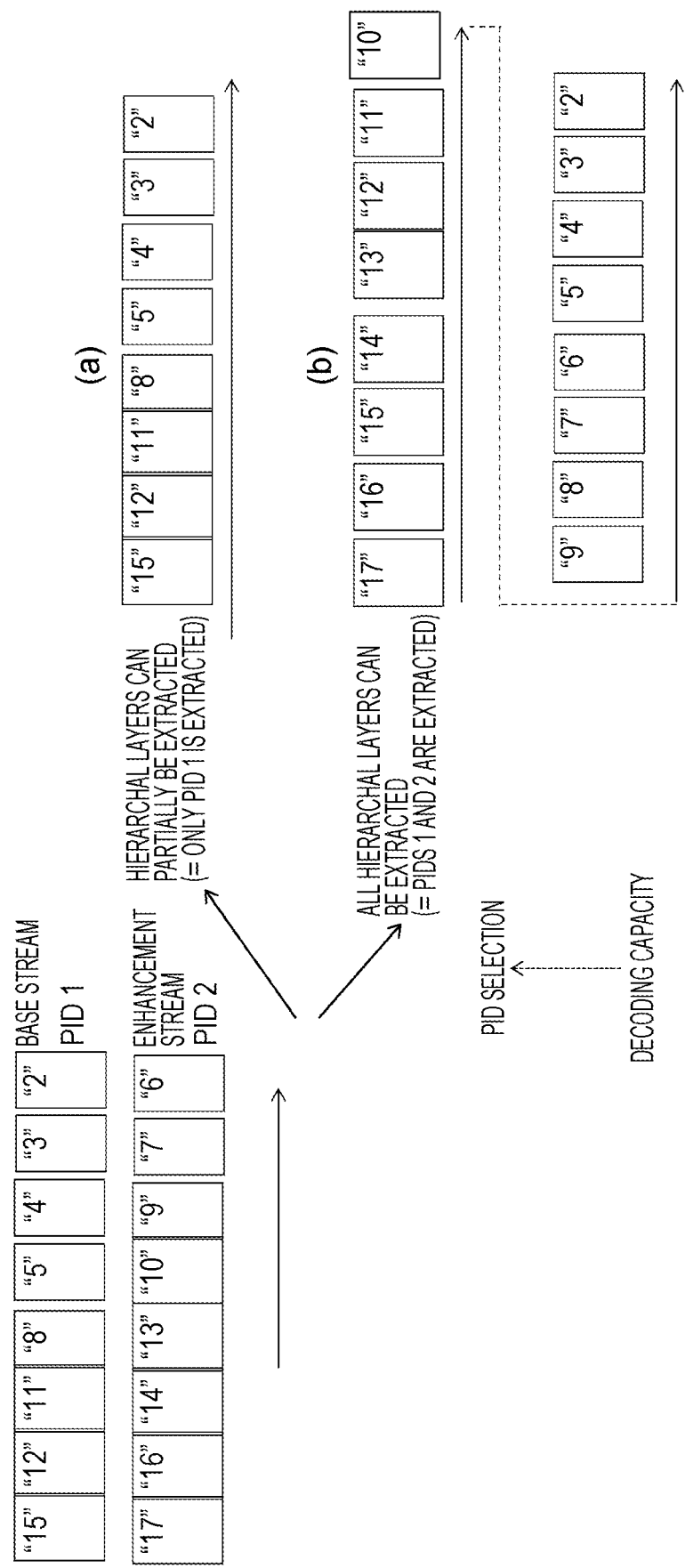
FIG. 15 is an explanatory diagram of stream selection in a demultiplexer in the reception device.

The reception unit 201 demodulates the RF modulation signal received at a reception antenna to obtain the transport stream TS. As illustrated in FIG. 15(*b*), the demultiplexer 202 extracts the base stream and the enhancement stream from the transport stream TS by filtering PID. Then, the demultiplexer 202 integrates the base stream and the enhancement stream into a video stream in accordance with the decoding timing information, and provides the video stream to the decoder 203.

The demultiplexer 202 extracts the section information from a layer in the transport stream TS, and transmits the section information to a control unit (not illustrated). At that time, the shutter speed information descriptor is also extracted. From the information, the control unit recognizes that the capturing speed information SEI is inserted in the encoded image data items included in the base stream and the enhancement stream.

The decoder 203 decodes the video stream provided from the demultiplexer 202 to provide the moving image data Q' (n) at 120 fps that corresponds to the moving image data Q(n) in the transmission device 100. The decoder 203 extracts the capturing speed information SEI inserted in the encoded image data item of each picture included in the video stream, and transmits the capturing speed information SEI to the control unit (not illustrated).

From the information, the control unit recognizes that the image data item corresponding to the encoded image data item of each picture included in the base stream is provided from an averaging process. The control unit further recognizes which averaging process is performed. The control unit further recognizes the shutter aperture time ratio of the image data item of each picture included in the moving image data Z(n) at 120 fps provided in the postprocessor 204 to be described below.

The postprocessor 204 processes the moving image data Q' (n) at 120 fps in an inverse process to the process with the preprocessor 101 in the transmission device 100 to provide the moving image data Z(n) at 120 fps that corresponds to the moving image data P(n). The postprocessor 204 performs the process with reference to the averaging process information under the control by the control unit when the image data item corresponding to the encoded image data item of each picture included in the base stream is provided from the averaging process.

Figure 16:
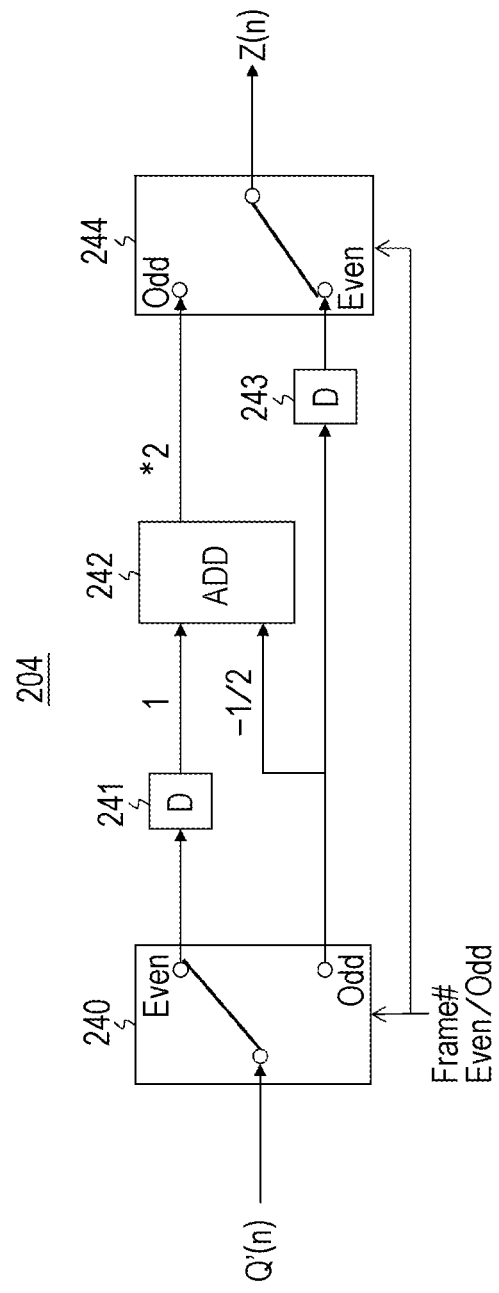
FIG. 16 is a block diagram of an exemplary configuration of the postprocessor included in the reception device.

FIG. 16 illustrates an exemplary configuration of the postprocessor 204. The postprocessor 204 includes switch circuits 240 and 244, delay elements 241 and 243 for a frame period, and an addition circuit 242. The moving image data Q' (n) at 120 fps is provided to a movable terminal of the switch circuit 240. The switch circuit 240 is connected to a fixed terminal on the "Even" side while an even frame is provided, and is connected to a fixed terminal on the "Odd" side while an odd frame is provided.

The image data item of an even frame provided at the fixed terminal on the "Even" side of the switch circuit 240 is delayed by a frame period in the delay element 241, and is input with a gain of "1" to the addition circuit 242. The image data item of an odd frame provided at the fixed terminal on the "Odd" side of the switch circuit 110 is input with a gain of "−½" to the addition circuit 242.

The addition circuit 242 subtracts the halved image data item of the odd frame from the image data item of the even frame in each of the units of consecutive two image data items (the image data items of an even frame and an odd frame). The image data item output from the addition circuit 242 is input to the fixed terminal on the "Odd" side of the switch circuit 244 with a gain of "2". The image data item of an odd frame provided at the fixed terminal on the side of the switch circuit 240 is delayed by a frame period in the delay element 243, and is input to the fixed terminal on the "Even" side of the switch circuit 244.

The switch circuit 244 is connected to the fixed terminal of the "Even" side while an even frame is provided, and is connected to the fixed terminal of the "Odd" side while an odd frame is provided. The moving image data Z(n) at 120 fps in which the image data items of the even frames and the image data items of the odd frames, which are restored to the state before the averaging process, are alternately placed is provided from the movable terminal of the switch circuit 244.

Figure 5:
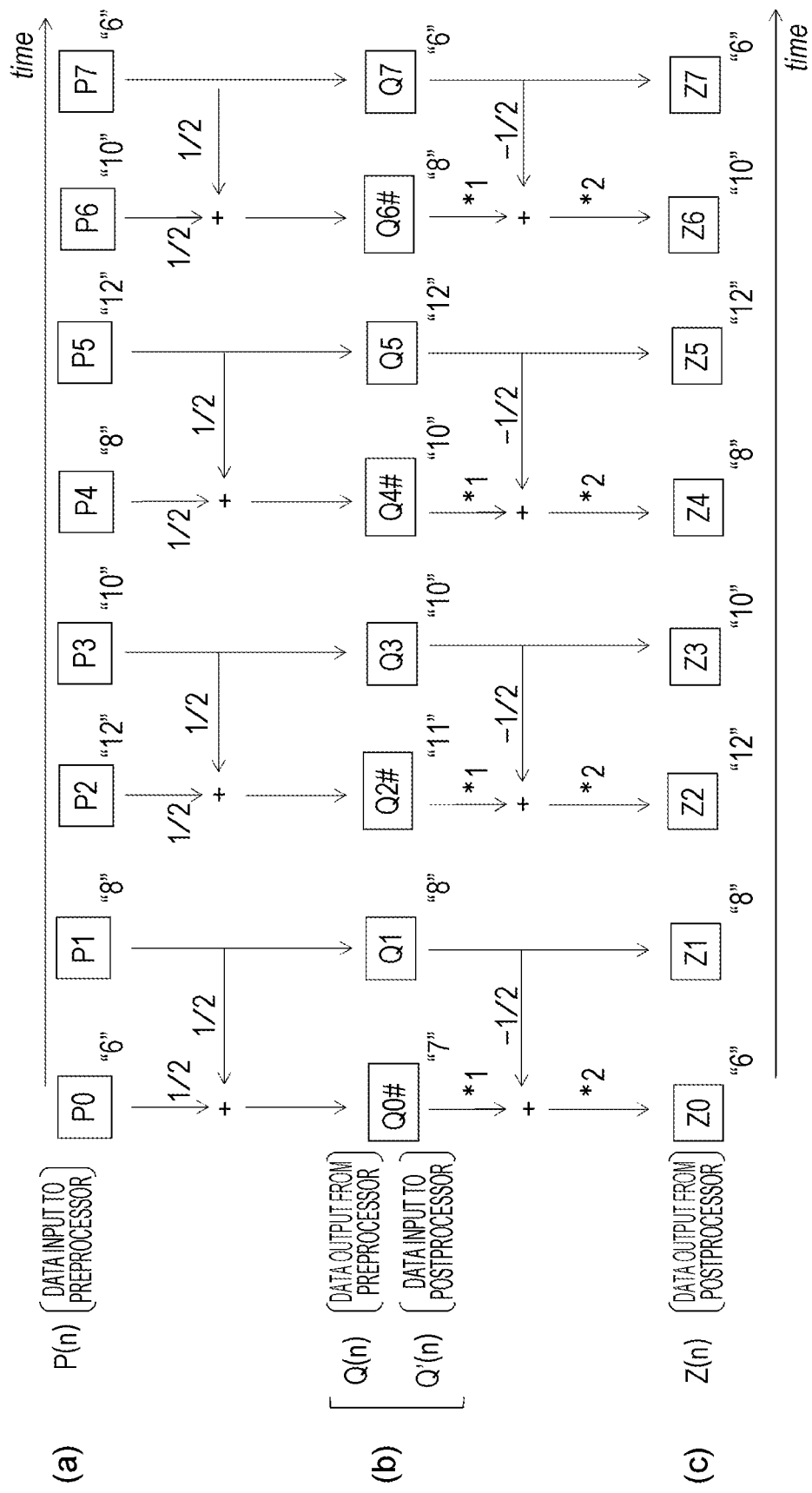
FIG. 5 is a diagram of an exemplary relationship among data items that are input to and output from the preprocessor included in the transmission device, and are input to and output from a postprocessor included in a reception device.

FIGS. 5(*b*) and 5(*c*) schematically illustrate the relationship between the data input to the postprocessor 204 (the moving image data Q' (n)) and the data output from the postprocessor 204 (the moving image data Z(n)). The image data items Z0, Z1, Z2, Z3, . . . of the pictures in the moving image data Q(n) are provided from the image data items Q0#, Q1, Q2#, Q3, . . . of the pictures in the moving image data Q' (n).

Note that, in FIGS. 5(*b*) and 5(*c*), the numerical value in the double quotation marks " " is an exemplary pixel value in the image data item in each frame. For example, the image data items Z0, Z2, and Z4 have pixel values of "6", "12", and "8", respectively, which are identical to the pixel values of "6", "12", and "8" of the image data items P0, P2, and P4. The values indicate that the image data items of the frames are restored to the state before the averaging process.

The display processor 205 interpolates the moving image data Z(n) at 120 fps provided in the postprocessor 204 in a temporal direction, namely, in a frame interpolation process to provide the moving image data at a frame rate higher than 120 fps. The display processor 205 switches the process for frame interpolation in accordance with the shutter aperture time ratio of the image data item of each pictures in the moving image data Z(n) under the control by the control unit.

This switching decreases the block size to be processed in a motion predicting process, for example, when the ratio of the shutter speed to the frame frequency decreases (when the shutter speed relatively increases), in other words, as the shutter aperture time ratio decreases. This switches the prediction algorithm to a prediction algorithm with a higher degree of accuracy. This enables the display with a high-definition stable quality.

The operation of the reception device 200 illustrated in FIG. 14 will briefly be described. The reception unit 201 demodulates the RF modulation signal received at a reception antenna to provide the transport stream TS. The transport stream TS is transmitted to the demultiplexer 202. The demultiplexer 202 extracts the base stream and the enhancement stream from the transport stream TS by filtering PID. Then, the demultiplexer 202 integrates the base stream and the enhancement stream into a video stream in accordance with the decoding timing information, and provides the video stream to the decoder 203.

The demultiplexer 202 extracts the section information from a layer in the transport stream TS, and transmits the section information to a control unit (not illustrated). At that time, the shutter speed information descriptor is also extracted. From this information, the control unit recognizes that the capturing speed information SEI is inserted in the encoded image data items included in the base stream and the enhancement stream.

The decoder 203 decodes the video stream provided from the demultiplexer 202 to provide the moving image data Q' (n) at 120 fps that corresponds to the moving image data Q(n) in the transmission device 100. The decoder 203 extracts the capturing speed information SEI inserted in the encoded image data item of each picture included in the video stream, and transmits the capturing speed information SEI to the control unit (not illustrated).

From this information, the control unit recognizes that the image data item corresponding to the encoded image data item of each picture included in the base stream is provided from an averaging process. The control unit further recognizes which averaging process is performed. The control unit further recognizes the shutter aperture time ratio of the image data item of each picture included in the moving image data Z(n) at 120 fps provided in the postprocessor 204 to be described below.

The moving image data of 120 fps provided in the decoder 203 is provided to the postprocessor 204. The postprocessor 204 processes the moving image data Q' (n) at 120 fps in an inverse process to the process with the preprocessor 101 in the transmission device 100 under the control by the control unit to provide the moving image data Z(n) at 120 fps that corresponds to the moving image data P(n). At that time, the control unit recognizes, in accordance with the capturing speed information SEI, that the image data item corresponding to the encoded image data item of each picture included in the base stream is provided from the averaging process. The postprocessor 204 performs a process with reference to the averaging process information.

The moving image data Z(n) at 120 Hz provided in the postprocessor 204 is provided to the display processor 205. The display processor 205 interpolates the moving image data Z(n) at 120 fps provided in the postprocessor 204 in a temporal direction, namely, in a frame interpolation process to provide the moving image data at a frame rate higher than 120 fps. The image data is provided to the display unit so that the image is displayed.

Figure 17:
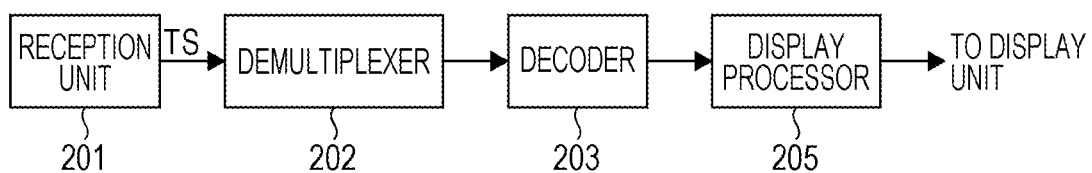
FIG. 17 is a block diagram of an exemplary configuration of a (normal frame rate compatible) reception device.

FIG. 17 illustrates an exemplary configuration of a reception device 200B that has a decoding capacity to decode the moving image data at 60 fps. In FIG. 17, the components corresponding to the components in FIG. 14 are put with the same reference signs, and the descriptions of the details will properly be omitted. The reception device 200B includes a reception unit 201, a demultiplexer 202, a decoder 203, and a display processor 205.

The reception unit 201 demodulates the RF modulation signal received at a reception antenna to obtain the transport stream TS. As illustrated in FIG. 15(*a*), the demultiplexer 202 extracts only the base stream from the transport stream TS by filtering PID to provide the base stream to the decoder 203.

The decoder 203 decodes the base stream provided from the demultiplexer 202 to provide the moving image data at 60 fps. The display processor 205 interpolates the moving image data at 60 fps provided in the decoder 203 in a temporal direction, namely, in a frame interpolation process to provide the moving image data at a frame rate higher than 60 fps. The image data is provided to the display unit so that the image is displayed.

As described above, the transmitting end in the transmission and reception system 10 illustrated in FIG. 1 does not transmit the moving image data P(n) at 120 fps that is the moving image data at a high frame rate as it is. The transmitting end transmits the image data in which the image data item provided by averaging the image data items in each of the units of two pictures in an averaging process is used as the image data item of the first picture in each of the units of two pictures.

Thus, for example, when having a decoding capacity to decode the moving image data at 60 fps (see FIG. 17), the receiving end selects only the encoded image data item of the first picture in each of the units of two pictures, and decodes the image data items to provide the moving image data at 60 fps. This enables the receiving end to display a smooth image. This can prevent a frame interpolation process with low load calculation from causing a problem on the image quality.

The receiving end in the transmission and reception system 10 illustrated in FIG. 1 restores the image data item of the first picture in each of the units of two pictures to the image data item before the averaging process. This enables the receiving end to display a smooth image with a high degree of sharpness at a high frame rate when the receiving end has a decoding capacity to decode, for example, the moving image data at 120 fps (see FIG. 14).

<2. Exemplary Variation>

Note that, although the frame rate of the entire data is 120 fps while the frame rate of the base stream is 60 fps in the embodiment, the combination of the frame rates is not limited to the embodiment. For example, the combination of the frame rates of 100 fps and 50 fps can be processed in a similar manner.

In the embodiment, the ratio of the frame rate of the entire data to the frame rate of the base stream is 2:1, in other words, N=2 holds. However, the present technology is applicable not only to the ratio 2:1, but also to another ratio in a similar manner.

Figure 18:
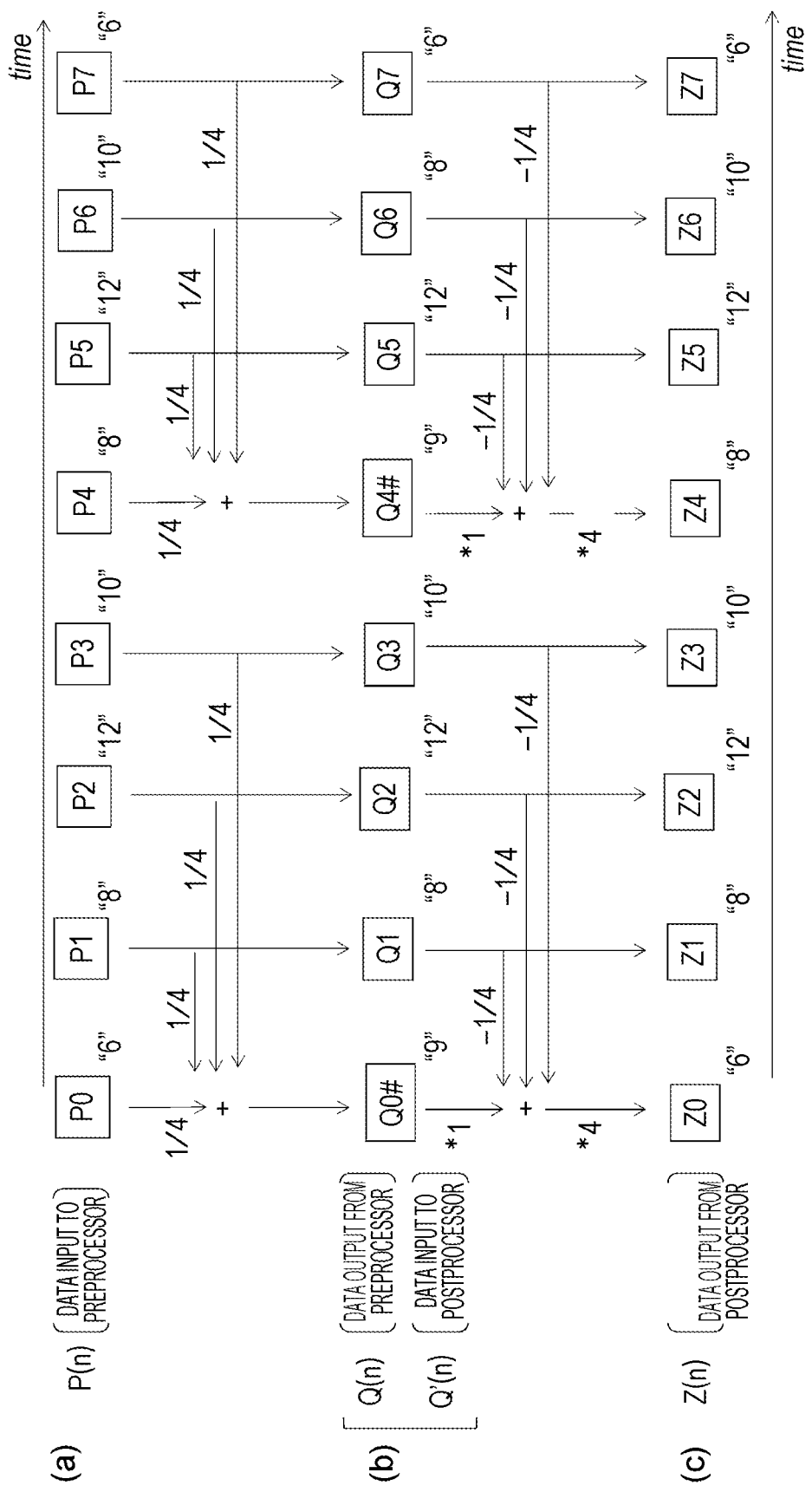
FIG. 18 is a diagram of an exemplary relationship among data items that are input to and output from the preprocessor included in the transmission device, and are input to and output from the postprocessor included in the reception device.

FIGS. 18(a) and 18(b) schematically illustrate an exemplary relationship between the data input to the preprocessor 101 (the moving image data P(n)) and the data output from the preprocessor 101 (the moving image data Q(n)) when the ratio is 4:1, in other words, N=4 holds. In this example, a linear average is calculated. The image data items Q0#, Q1, Q2, Q3, Q4#, Q5, Q26#, Q7 . . . of pictures in the moving image data Q(n) are provided from the image data items P0, P1, P2, P3, P4, P5, P6, P7 . . . of pictures in the moving image data P(n), respectively.

Note that, in FIGS. 18(a) and 18(b), the numerical value in the double quotation marks " " is an exemplary pixel value in the image data item in each frame. For example, the image data item Q0# has a pixel value of "9", which is the average of the pixel values "6", "8", "12", and "10" of the image data items P0, P1, P2, and P3. This value indicates that the image data Q0# is provided by linearly averaging the image data items P0, P1, P2, and P3. For example, the image data items Q1, Q2, and Q3 have pixel values of "8", "12", and "10", which are the same as the pixel values "8", "12", and "10" of the image data items P1, P2, and P3. The values indicate that the image data items Q1, Q2, and Q3 are identical to the image data items P1, P2, and P3.

FIGS. 18(b) and 18(c) schematically illustrate an exemplary relationship between the data input to the postprocessor 204 (the moving image data Q' (n)) and the data output from the postprocessor 204 (the moving image data Z(n)) when the ratio is 4:1, in other words, N=4 holds. The image data items Z0, Z1, Z2, Z3, Z4, Z5, Z6, Z7 . . . of pictures in the moving image data Q(n) are provided from the image data items Q0#, Q1, Q2, Q3, Q4#, Q5, Q26#, Q7 . . . of pictures in the moving image data Q'(n), respectively.

Note that, in FIGS. 18(b) and 18(c), the numerical value in the double quotation marks " " is an exemplary pixel value in the image data item in each frame. For example, the image data items Z0 and Z4 have pixel values of "6" and "8", respectively, which are identical to the pixel values of "6" and "8" of the image data items P0 and P4. The values indicate that the image data items of the frames are restored to the state before the averaging process.

In the embodiment, the transmission and reception system 10 includes the transmission device 100 and the reception device 200. However, the configuration of the transmission and reception system to which the present technology is applicable is not limited to the embodiment. For example, the reception device 200 can include a set-top box and a monitor that are connected via a digital interface such as a High-Definition Multimedia Interface (HDMI). Note that "HDMI" is a registered trademark.

The container is a transport stream (MPEG-2 TS) in the embodiment. However, the present technology is similarly applicable to a system configured to use a network such as the Internet to distribute data to the receiving terminals. A container in an MP4 format or another format is often used for distribution via the Internet. In other words, various containers such as a transport stream (MPEG-2 TS) used in digital broadcasting standards, or a container in an MP4 format used for distribution via the Internet can be used as the container.

Alternatively, the present technology can have the following configuration.

(1)

A transmission device including:

an image processing unit that provides second moving image data at a predetermined frame rate by processing first moving image data at the predetermined frame rate in units of consecutive N pictures, using an image data item provided by averaging image data items of the N pictures in an averaging process as an image data item of a first picture, and using image data items of second to Nth pictures of the N pictures as image data items of second to Nth pictures without any change, the N being an integer larger than or equal to two;

an image encoding unit that generates a video stream by encoding the image data items of the pictures in the second moving image data provided in the image processing unit; and a transmission unit that transmits the video stream generated in the image encoding unit.

(2)

The transmission device according to (1), wherein the image encoding unit generates a first video stream that includes the encoded image data item of the first picture in each of the units of N pictures, and a predetermined number of second video streams that include the encoded image data items of the second to Nth pictures in each of the units of N pictures.

(3)

The transmission device according to (2), wherein the image encoding unit classifies the image data items of the pictures in the second moving image data provided in the image processing unit into a plurality of hierarchal layers, encodes the classified image data items of the pictures in each of the hierarchal layers, divides the hierarchal layers into a predetermined number of hierarchal groups, and generates a predetermined number of video streams, the video streams include the encoded image data items of the pictures in each of the divided hierarchal groups, and a lowest hierarchal group includes the encoded image data item of the first picture in each of the units of N pictures.

(4)

The transmission device according to (2) or (3), wherein the image encoding unit inserts first identification information into the encoded image data items in the first video stream, and the first identification information indicates that the first video stream includes a temporally varying element of the second video stream.

(5)

The transmission device according to any of (2) to (4), wherein the image encoding unit further inserts information about the averaging process into the encoded image data items in the first video stream.

(6)

The transmission device according to (4) or (5), wherein
the transmission unit transmits the container being in a predetermined format and including the video streams,
the transmission device further including:
an identification information inserting unit that inserts second identification information into a layer in a container, the second identification information indicating that the first identification information is inserted in the encoded image data items in the first video stream.

(7)

The transmission device according to any of (1) to (6), wherein
the image encoding unit inserts information about a shutter aperture time ratio of the image data item of each of the pictures in the first moving image data at the predetermined frame rate into the encoded image data items included in the video stream.

(8)

A transmission method including:
an image processing step of providing second moving image data at a predetermined frame rate by processing first moving image data at the predetermined frame rate in units of consecutive N pictures, using an image data item provided by averaging image data items of the N pictures in an averaging process as an image data item of a first picture, and using image data items of second to Nth pictures of the N pictures as image data items of second to Nth pictures without any change, the N being an integer larger than or equal to two;
an image encoding step of generating a video stream by encoding the image data items of the pictures in the second moving image data provided in the image processing step; and
a transmission step of transmitting the video stream generated in the image encoding step.

(9)

A reception device including:
a reception unit that receives a video stream, the video stream being generated by encoding an image data item of each picture in moving image data at a predetermined frame rate; and
a processing unit that processes the video stream received with the reception unit,
wherein the moving image data at the predetermined frame rate is second moving image data at the predetermined frame rate, and the second moving image data is provided by processing first moving image data at the predetermined frame rate in units of consecutive N pictures, using an image data item provided by averaging image data items of the N pictures in an averaging process as an image data item of a first picture, and using image data items of second to Nth pictures of the N pictures as image data items of second to Nth pictures without any change, and the N is an integer larger than or equal to two.

(10)

The reception device according to (9), wherein
the video stream received with the reception unit includes a first video stream that includes the encoded image data item of the first picture in each of the units of N pictures, and a predetermined number of second video streams that include the encoded image data items of the second to Nth pictures in each of the units of N pictures.

(11)

A reception device including:
a reception unit that receives a video stream generated by encoding an image data item of each picture in second moving image data at a predetermined frame rate, the second moving image data being provided by processing first moving image data at the predetermined frame rate in units of consecutive N pictures, using an image data item provided by averaging image data items of the N pictures in an averaging process as an image data item of a first picture, and using image data items of second to Nth pictures of the N pictures as image data items of second to Nth pictures without any change, the N being an integer larger than or equal to two;
an image decoding unit that provides the second moving image data at the predetermined frame rate by decoding the video stream received with the reception unit; and
an image processing unit that provides the first moving image data by processing the second moving image data provided in the image decoding unit.

(12)

The reception device according to (11), wherein
the video stream received with the reception unit includes a first video stream that includes the encoded image data item of the first picture in each of the units of N pictures, and a predetermined number of second video streams that include the encoded image data items of the second to Nth pictures in each of the units of N pictures.

(13)

The reception device according to (11) or (12), further including:
a display processing unit that provides third moving image data at a frame rate higher than the predetermined frame rate by interpolating the first moving image data provided in the image processing unit in a temporal direction.

(14)

The reception device according to (13), wherein
information about a shutter aperture time ratio of an image data item of each picture in the first moving image data is inserted in an encoded image data item of each picture in the video stream received with the reception unit, and
the display processing unit switches processes for frame interpolation in accordance with the shutter aperture time ratio information.

(15)

A reception method including:
a reception step of receiving a video stream generated by encoding an image data item of each picture in second moving image data at a predetermined frame rate, the second moving image data being provided by processing first moving image data at the predetermined frame rate in units of consecutive N pictures, using an image data item provided by averaging image data items of the N pictures in an averaging process as an image data item of a first picture, and using image data items of second to Nth pictures of the N pictures as image data items of second to Nth pictures without any change, the N being an integer larger than or equal to two;
an image decoding step of providing the second moving image data at the predetermined frame rate by decoding the video stream received with the reception step; and
an image processing step of providing the first moving image data by processing the second moving image data provided in the image decoding step.

(16)

A transmission device including:
an image encoding unit that generates a video stream by encoding an image data item of each picture in moving image data at a predetermined frame rate; the image encoding unit that inserts information about a shutter aperture time ratio of an image data item of each picture in the first moving image data at the predetermined frame rate into the encoded image data item of each picture in the video stream; and a transmission unit that transmits the video stream generated in the image encoding unit.

(17)

A reception device including:

a reception unit that receives a video stream provided by encoding an image data item of each picture in moving image data at a predetermined frame rate;

an image decoding unit that provides the moving image data at the predetermined frame rate by decoding the video stream received with the reception unit; and a display processing unit that provides third moving image data at a frame rate higher than the predetermined frame rate by interpolating the first image data provided in the image decoding unit in a temporal direction, wherein information about a shutter aperture time ratio of an image data item of each picture in the moving image data at the predetermined frame rate is inserted in an encoded image data item of each picture in the video stream received with the reception unit, and the display processing unit switches processes for frame interpolation in accordance with the shutter aperture time ratio information.

A main feature of the present technology is to transmit the image data item provided by averaging the image data items of N pictures as the image data item of the first picture in each of the units of N pictures in order to transmit the moving image data at a high frame rate. This can secure the compatibility with a conventional receiver that is compatible with a normal frame rate (see FIGS. 3 to 5).

REFERENCE SIGNS LIST

10 Transmission and reception system
100 Transmission device
101 Preprocessor
102 Encoder
103 Multiplexer
104 Transmission unit
110, 114 Switch circuit
111, 113 Delay element
112 Addition circuit
200, 200A, 200B Reception device
201 Reception unit
202 Demultiplexer
203 Decoder
204 Postprocessor
205 Display processor
240, 244 Switch circuit
241, 243 Delay element
242 Addition circuit

The invention claimed is:

1. A transmission device comprising:
processing circuitry configured to
generate, for each of a plurality of units of N consecutive pictures of a plurality of pictures, an averaged picture based on an averaging process in which a non-linear average of the N consecutive pictures of the respective unit is calculated with different gains, and
generate a video stream by encoding, for each of the plurality of units, the averaged picture and N−1 of the N consecutive pictures of the respective unit, the video stream including a first sub-layer having the encoded averaged pictures and a second sub-layer having the encoded N−1 pictures of the plurality of units; and
a transmitter configured to transmit the generated video stream and information including averaging process information indicating a method for the averaging process, wherein
the video stream is to be processed in accordance with the averaging process information, and
the information further includes identification information indicating existence of the averaging process information in the information.

2. The transmission device according to claim 1, wherein the processing circuitry is configured to classify the averaged pictures and the N−1 pictures of the plurality of units into a plurality of hierarchal layers, encode the classified averaged and N−1 pictures of the plurality of units in the hierarchal layers, and divide the hierarchal layers into a number of hierarchal groups,
wherein the first sub-layer includes a lowest hierarchal group having the encoded averaged pictures of the plurality of units.

3. The transmission device according to claim 1, wherein the processing circuitry is configured to insert the information into the encoded averaged pictures in the video stream.

4. The transmission device according to claim 3, wherein the transmitter is configured to transmit a container including the video stream, and
the processing circuitry is further configured to insert a descriptor into a layer in the container, the descriptor indicating that the information is inserted in the encoded averaged pictures in the video stream.

5. The transmission device according to claim 1, wherein the video stream has a frame rate that is a multiple of 50 or 60 frames per second.

6. A reception device comprising:
processing circuitry configured to
receive a video stream that includes, for each of a plurality of units of N consecutive pictures of a plurality of pictures, an encoded averaged picture and encoded N−1 of the N consecutive pictures of the respective unit, the averaged picture being generated based on an averaging process in which a non-linear average of the N consecutive pictures of the respective unit is calculated with different gains, the video stream including a first sub-layer having the encoded averaged pictures and a second sub-layer having the encoded N−1 pictures of the plurality of units,
receive information including averaging process information indicating a method for the averaging process, and
process the received video stream in accordance with the averaging process information,
wherein the information further includes identification information indicating existence of the averaging process information in the information.

7. The reception device according to claim 6, wherein the information is inserted into the encoded averaged pictures in the video stream.

8. The reception device according to claim 7, wherein the processing circuitry is configured to
receive a container including the video stream, and
receive a descriptor that is inserted into a layer in the container, wherein the descriptor includes information indicating that the information is inserted in the encoded averaged pictures in the video stream.

9. The reception device according to claim 6, wherein the processing circuitry is configured to
provide second moving image data of a frame rate higher than a frame rate of first moving image data of the plurality of pictures by interpolating the first moving image data in a temporal direction.

10. The reception device according to claim 6, wherein the processing circuitry is configured to perform an addition process and a subtraction process on the averaged pictures and the N−1 pictures of the plurality of units in accordance with the averaging process information.

11. The reception device according to claim 6, wherein the video stream has a frame rate that is a multiple of 50 or 60 frames per second.

12. A reception method comprising:
receiving a video stream that includes, for each of a plurality of units of N consecutive pictures of a plurality of pictures, an encoded averaged picture and encoded N−1 of the consecutive pictures of the respective unit, the averaged picture being generated based on an averaging process in which a non-linear average of the N consecutive pictures of the respective unit is calculated with different gains, the video stream including a first sub-layer having the encoded averaged pictures and a second sub-layer having the encoded N−1 pictures of the plurality of units;
receiving information including averaging process information indicating a method for the averaging process; and
processing, by processing circuitry of a reception device, the received video stream in accordance with the averaging process information,
wherein the information further includes identification information indicating existence of the averaging process information in the information.

13. The reception method according to claim 12, wherein the information is inserted into the encoded averaged pictures in the video stream.

14. The reception method according to claim 13, further comprising:
receiving a container including the video stream, and
receiving a descriptor that is inserted into a layer in the container, wherein the descriptor includes information indicating that the information is inserted in the encoded averaged pictures in the video stream.

15. The reception method according to claim 12, further comprising:
providing second moving image data of a frame rate higher than a frame rate of first moving image data of the plurality of pictures by interpolating the first moving image data in a temporal direction.

16. The reception device according to claim 12, further comprising:
performing an addition process and a subtraction process on the averaged pictures and the N−1 pictures of the plurality of units in accordance with the averaging process information.

17. The reception method according to claim 12, wherein the video stream has a frame rate that is a multiple of 50 or 60 frames per second.

* * * * *